(12) United States Patent
Tada (10) Patent No.: US 6,232,906 B1
(45) Date of Patent: May 15, 2001

(54) QUATERNARY FSK RECEIVER AND METHOD OF JUDGING SIGNALS IN QUATERNARY FSK RECEIVER

(75) Inventor: Ken-ichi Tada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/387,524

(22) Filed: Sep. 1, 1999

(30) Foreign Application Priority Data

Sep. 1, 1998 (JP) .................................................. 10-247425

(51) Int. Cl.[7] ...................................................... H03M 1/12
(52) U.S. Cl. ............................................. 341/155; 455/130
(58) Field of Search ..................................... 341/155, 157; 455/130, 334, 340

(56) References Cited

U.S. PATENT DOCUMENTS

| 4,355,401 | * | 10/1982 | Ikoma et al. | 375/5 |
| 5,303,396 | * | 4/1994 | Ooyagi et al. | 455/134 |
| 5,630,227 | * | 5/1997 | Bella et al. | 455/324 |

FOREIGN PATENT DOCUMENTS

| 1-164151 | 6/1989 | (JP) | H04L/25/03 |
| 7-154433 | 6/1995 | (JP) | H04L/27/14 |
| 2639326 | 4/1997 | (JP) | H04L/27/14 |
| 9-247219 | 9/1997 | (JP) | H04L/27/14 |
| 10-145442 | 5/1998 | (JP) | H04L/27/156 |

* cited by examiner

*Primary Examiner*—Peguy JeanPierre
(74) *Attorney, Agent, or Firm*—McGuireWoods LLP (57) ABSTRACT

There is provided a quaternary FSK receiver which calculates an average of demodulated signals when a received quaternary FSK signal is converted into a quaternary digital signal, and the digital signal is entirely gradually increased or decreased in level so that the average is equal to a second reference value. This reduces influence exerted by fluctuation in a central value of the demodulated signal. The first and third reference values are varied in accordance with levels of "10" and "00" of the digital signal. Thus, it is possible to reduce sign error which is caused by fluctuation in an amplitude of the demodulated signal.

8 Claims, 5 Drawing Sheets

QUATERNARY FSK RECEIVER AND METHOD OF JUDGING SIGNALS IN QUATERNARY FSK RECEIVER

BACKGROUND OF THE INVENTION

1. Field of the Invention

The invention relates to a quaternary FSK (Frequency Shift Keying) receiver for receiving a signal to which quaternary FSK is applied, and further to a method of dealing with signals in a quaternary FSK receiver.

2. Description of the Related Art

The quaternary FSK communication system is a system wherein quaternary gray signs "00", "01", "11" and "10" correspond to four different frequencies such as f1, f2, f3 and f4. A quaternary FSK receiver used for quaternary FSK communication receives signals to which quaternary FSK is applied, and judges which frequency a frequency of the received signals correspond to among the four frequencies f1, f2, f3 and f4, to thereby demodulate the received signals.

In the above-mentioned signal sign judging in a quaternary FSK receiver, a frequency of the received signals is converted into a voltage by means of a frequency-voltage converter, and the thus obtained voltage is compared to three reference values, that is, first to third reference values, to thereby judge a sign of a signal. Herein, the first reference value is set greater than the second reference value, and the second reference value is set greater than the third reference value.

In the process of signal sign judging, for instance, if the obtained voltage is equal to or greater than the first reference value, a sign of the received signal is determined to be "10", if the obtained voltage is smaller than the first reference value and equal to or greater than the second reference value, a sign of the received signal is determined to be "11", if the obtained voltage is smaller than the second reference value and equal to or greater than the third reference value, a sign of the received signal is determined to be "01", and if the obtained voltage is smaller than the third reference value, a sign of the received signal is determined to be "00".

In a conventional quaternary FSK receiver, the above-mentioned first to third reference values to be used as a reference for judging a sign of a received signal are fixed values. However, if the first to third reference values are fixed, there is caused a problem that an error occurs in signal sign judging, if a central voltage in a detecting signal due to fluctuation in a frequency of transmitted signals, variation in a temperature of a quaternary FSK receiver, fluctuation in a power source voltage, and so on.

In order to solve such a problem, Japanese Unexamined Patent Publication No. 1-164151 has suggested a method of judging a sign of a received signal, in which a voltage level of respective signs is measured by means of a capacitor, and voltages used for judgement, established based on the thus measured voltage levels, are used as reference values.

In a quaternary FSK receiver having been disclosed in Japanese Unexamined Patent Publication No. 7-154434 (Japanese Patent No. 2639326), data is sampled while a preamble signal is being detected, and the thus sampled data is converted into digital signals to thereby detect a gap between an average value of received data and a central value of reference values, which corresponds to the second reference in the above-mentioned case. Then, a sign of a received signal is judged using the average value of received data as the central value of reference values.

However, in the method having been suggested in Japanese Unexamined Patent Publication No. 1-164151, a voltage accumulated in a capacitor is used as a reference value, and the voltage or the reference voltage is varied only at a specific timing. In the quaternary FSK receiver having been disclosed in Japanese Unexamined Patent Publication No. 7-154434, the reference voltage is altered only while a preamble signal is being detected.

Hence, if a reference value is set in wrong, it would take much time to change the wrongly set reference value into a correct reference value, and the wrongly set reference value could not follow small fluctuation in a demodulated signal.

In addition, the conventional quaternary FSK receiver carries out only to harmonize an average value of received data to the second reference. The first and third reference values are set equal to fixed values which are obtained on the assumption that a demodulated signal has an ideal amplitude. However, an amplitude of a demodulated signal is not always an ideal one, but actually varies.

Hereinbelow is explained how an amplitude of a demodulated signal varies, with reference to FIG. 1.

A signal having been transmitted from a transceiver is first frequency-converted, and then, is converted into a voltage signal by means of a frequency-voltage (f-V) converter. A frequency-voltage conversion characteristic is basically linear. Herein, it is assumed that the conversion characteristic represented as "characteristic A" in FIG. 1 is an ideal one. However, an inclination of the conversion characteristic varies due to variance in characteristics of circuit parts constituting a f-V converter and temperature characteristic of a f-V converter. Hence, it is assumed that an inclination of the characteristic line is decreased, specifically, the characteristic A varies to the characteristic B.

Figure 1:
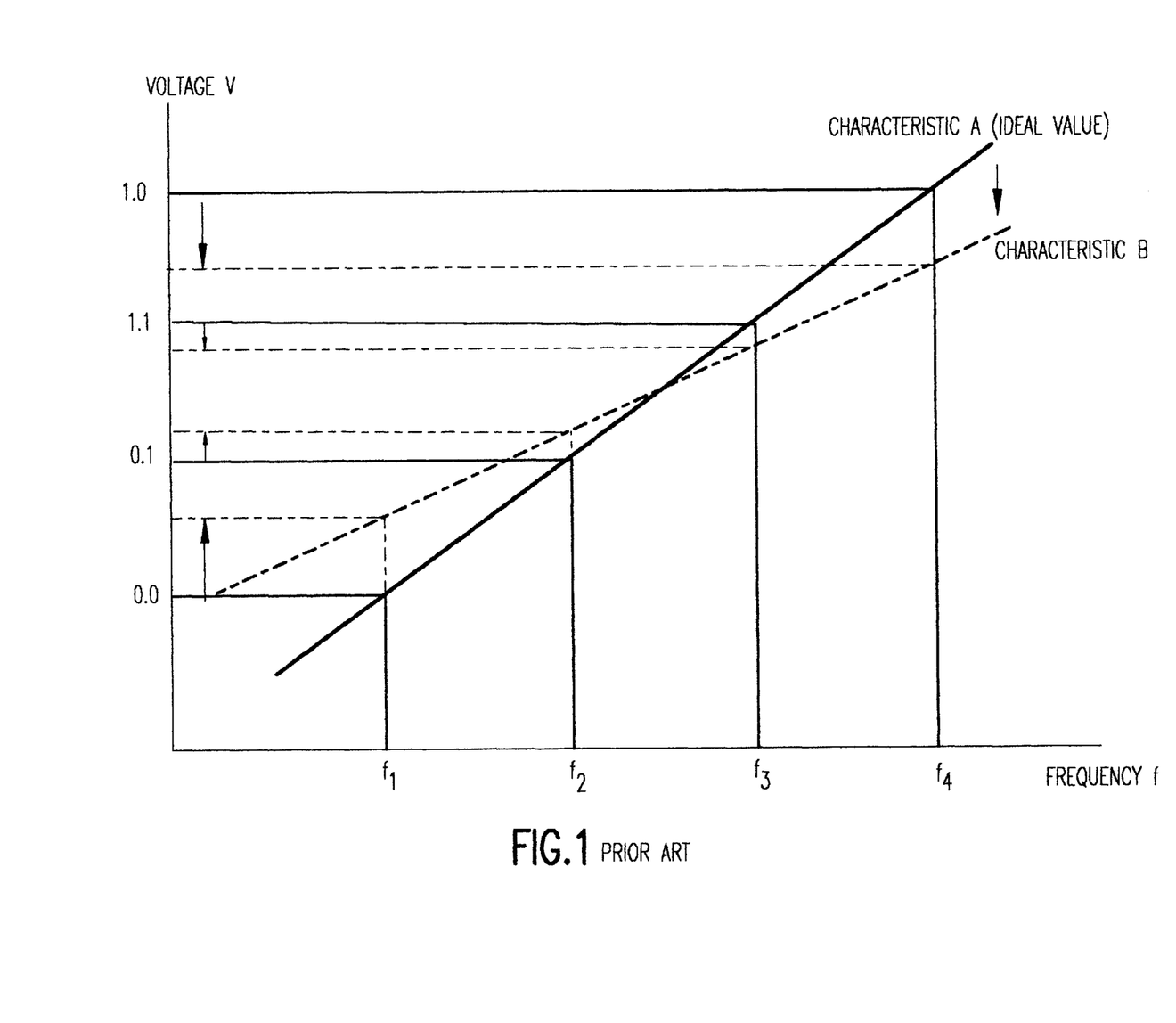
FIG. 1 is a graph showing how an amplitude of a demodulated signal varies.

As will be obvious in view of FIG. 1, if an inclination of the conversion characteristic of a f-V converter is decreased, an amplitude of a demodulated signal transmitted from a signal receiving circuit is decreased in proportion to a degree to which the inclination is decreased. On the other hand, if an inclination of the conversion characteristic of a f-V converter is increased, an amplitude of a demodulated signal transmitted from a signal receiving circuit is increased in proportion to a degree to which the inclination is decreased.

However, as mentioned earlier, the conventional quaternary FSK receiver carries out only to harmonize an average value of received data to the second reference. The first and third reference values are set equal to predetermined fixed values obtained on the assumption that a demodulated signal has an ideal amplitude. As a result, if an amplitude of a demodulated signal varies due to variation in characteristic of a signal receiving circuit, there may occur an error in judging a sign of a received signal.

Japanese Unexamined Patent Publication No. 7-154433 has suggested a quaternary FSK receiver comprising means for judging a sign of a signal by comparing detection signals in a quaternary FSK signal to reference levels, an average calculator for calculating an average of the detection signals, and a circuit for generating the reference levels by using the average as a reference value.

Japanese Unexamined Patent Publication No. 9-247219 has suggested an apparatus for judging a symbol indicated by a base band signal supplied from a demodulator.

Japanese Unexamined Patent Publication No. 10-145442 has suggested a radio signal selective calling receiver comprising first means for receiving a signal including a synchronization signal, and processing the thus received signal, second means for detecting a specific pattern in the synchronization signal, and storing the specific pattern as a specimen value, third means for determining optimal threshold values to be used as a reference value for judging a signal, based on the specimen value, and fourth means for judging a signal in accordance with an output of the third means.

However, the above-mentioned conventional quaternary FSK receiver and method are accompanied with the following problems.

First, since a reference value is changed only at a specific timing, if a firstly established reference value is a wrong one, it would take much time to correct it, and it would not be possible for the receiver to follow small fluctuation in a demodulated signal.

Second, there occurs an error in judging a sign of a signal, if an amplitude of a demodulated signal varies.

SUMMARY OF THE INVENTION

It is an object of the present invention to provide a quaternary FSK receiver and a method of judging signals in a quaternary FSK receiver, both of which are capable of correcting a wrongly established reference value into a correct one in a short period of time, following small fluctuation in a demodulated signal, and preventing occurrence of a sign error, even if an amplitude of a demodulated signal varies.

In one aspect of the present invention, there is provided a quaternary FSK receiver including (a) a receiver which receives quaternary FSK applied signals and converts the thus received quaternary FSK applied signals into demodulated signals, (b) an initial value generator which, when the demodulated signals have ideal amplitudes, generates first, second, third and fourth ideal values each corresponding to each of signs of a quaternary, and also generates a first reference value intermediate between the first ideal value and the second ideal value, a second reference value intermediate between the second ideal value and the third ideal value, and a third reference value intermediate between the third ideal value and the fourth ideal value, (c) an analog-digital converter which converts the demodulated signals into digital signals, (d) a sign judge which compares the digital signals to the first to third reference values to thereby judge which sign a received signal has among signs of a quaternary, (e) an average calculator which calculates an average of the digital signals, (f) a waveform shaper which always gradually entirely increases or decreases the digital signals by a predetermined value so that the average is equal to the second reference value, and (g) a reference value generator which varies the first reference value in accordance with a digital signal having a value equal to or greater than the first reference value, among the digital signals having been waveform-shaped by the waveform shaper, and also varies the third reference value in accordance with a digital signal having a level equal to or smaller than the third reference value, among the digital signals having been waveform-shaped by the waveform shaper.

In accordance with the present invention, when received quaternary FSK signals are converted into digital signals, an average of demodulated signals is calculated, and the digital signals are always entirely and gradually increased or decreased such that the calculated average becomes equal to the second reference value which is a central level in reference values. As a result, it is possible to reduce influence exerted by fluctuation in a central value of the demodulated signals.

In addition, the first reference value is varied in accordance with a digital signal equal to or greater than the first reference value, and the third reference value is varied in accordance with a digital signal equal to or smaller than the third reference value. Thus, it is possible to reduce a sign error which would occur due to fluctuation in an amplitude of demodulated signals, which ensures higher accuracy with which radio signals are received.

It is preferable that the quaternary FSK receiver further includes a timing controller which disallows the reference value generator to vary a reference value while a synchronization signal is being received, and allows the reference value generator to vary a reference value after the synchronization signal has been received.

For instance, the reference value generator may be designed to increase the first ideal value and the first reference value by a predetermined value when a digital signal having been waveform-shaped by the waveform shaper has a level equal to or greater than the first ideal value, decrease the first ideal value and the first reference value by a predetermined value when a digital signal having been waveform-shaped by the waveform shaper has a level smaller than the first ideal value and equal to or greater than the first reference value, increase the third reference value and the fourth ideal value by a predetermined value when a digital signal having been waveform-shaped by the waveform shaper has a level smaller than the third reference value and equal to or greater than the fourth ideal value, and decrease the third reference value and the fourth ideal value by a predetermined value when a digital signal having been waveform-shaped by the waveform shaper has a level smaller than the fourth ideal value.

The reference value generator may be comprised of (a) a first counter which counts how many times a digital signal having been waveform-shaped by the waveform shaper has a level equal to or greater than the first ideal value, (b) a second counter which counts how many times a digital signal having been waveform-shaped by the waveform shaper has a level smaller than the first ideal value and equal to or greater than the first reference value, (c) a first comparator which compares counts of the first and second counters to each other, and increases the first ideal value and the first reference value by a predetermined value when a count of the first counter is greater than a count of the second counter, and decreases the first ideal value and the first reference value by a predetermined value when a count of the second counter is greater than a count of the first counter, (d) a third counter which counts how many times a digital signal having been waveform-shaped by the waveform shaper has a level equal to or greater than the fourth ideal value and smaller than the third ideal value, (e) a fourth counter which counts how many times a digital signal having been waveform-shaped by the waveform shaper has a level smaller than the fourth ideal value, and (f) a second comparator which compares counts of the third and fourth counters to each other, and increases the third reference value and the fourth ideal value by a predetermined value when a count of the third counter is greater than a count of the fourth counter, and decreases the third reference value and the fourth ideal value by a predetermined value when a count of the fourth counter is greater than a count of the third counter.

In accordance with the present invention, even if levels of the demodulated signals are temporarily disturbed due to noises, since the first and third reference values are varied under majority rule of a plurality of data, it would be possible to prevent the first and third reference values from being wrongly varied.

In another aspect of the present invention, there is provided a method of judging signals in a quaternary FSK receiver, including the steps of (a) converting quaternary FSK applied signals having been received, into demodulated signals, (b) generating first, second, third and fourth ideal values each corresponding to each of signs of a quaternary, and also generating a first reference value intermediate between the first ideal value and the second ideal value, a second reference value intermediate between the second ideal value and the third ideal value, and a third reference value intermediate between the third ideal value and the fourth ideal value, when the demodulated signals have ideal amplitudes, (c) converting the demodulated signals into digital signals, (d) comparing the digital signals to the first to third reference values to thereby judge which sign a received signal has among signs of a quaternary, (e) calculating an average of the digital signals, (f) gradually entirely increasing or decreasing the digital signals all the time by a predetermined value so that the average is equal to the second reference value, and (g) varying the first reference value in accordance with a digital signal having a value equal to or greater than the first reference value, among the digital signals having been waveform-shaped by the waveform shaper, and also varying the third reference value in accordance with a digital signal having a level equal to or smaller than the third reference value, among the digital signals having been waveform-shaped by the waveform shaper.

It is preferable that the method further includes the step of disallowing a reference value to be varied while a synchronization signal is being received, and allowing a reference value to be varied after the synchronization signal has been received.

For instance, in the step (g), the first ideal value and the first reference value are increased by a predetermined value when a digital signal having been waveform-shaped has a level equal to or greater than the first ideal value, the first ideal value and the first reference value are decreased by a predetermined value when a digital signal having been waveform-shaped has a level smaller than the first ideal value and equal to or greater than the first reference value, the third reference value and the fourth ideal value are increased by a predetermined value when a digital signal having been waveform-shaped has a level smaller than the third reference value and equal to or greater than the fourth ideal value, and the third reference value and the fourth ideal value are decreased by a predetermined value when a digital signal having been waveformshaped has a level smaller than the fourth ideal value.

The step (g) may be designed to include the steps of (g1) counting how many times a digital signal having been waveform-shaped has a level equal to or greater than the first ideal value, to thereby have a first count, (g2) counting how many times a digital signal having been waveform-shaped has a level smaller than the first ideal value and equal to or greater than the first reference value, to thereby have a second count, (g3) comparing the first and second counts to each other, (g4) increasing the first ideal value and the first reference value by a predetermined value when the first count is greater than the second count, or decreasing the first ideal value and the first reference value by a predetermined value when the second count is greater than the first count, (g5) counting how many times a digital signal having been waveform-shaped has a level equal to or greater than the fourth ideal value and smaller than the third ideal value, to thereby have a third count, (g6) counting how many times a digital signal having been waveform-shaped has a level smaller than the fourth ideal value, to thereby have a fourth count, (g7) comparing the third and fourth counts to each other, and (g8) increasing the third reference value and the fourth ideal value by a predetermined value when the third count is greater than the fourth count, or decreasing the third reference value and the fourth ideal value by a predetermined value when the fourth count is greater than the third count.

In accordance with the present invention, even if a central level and an amplitude of demodulated signals are varied, since conformity to a central level and variation of reference values are always carried out, it would be possible accurately follow variation in demodulated signals which variation occurs while signals are being received, ensuring enhancement in sensitivity of the quaternary FSK receiver.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 2:
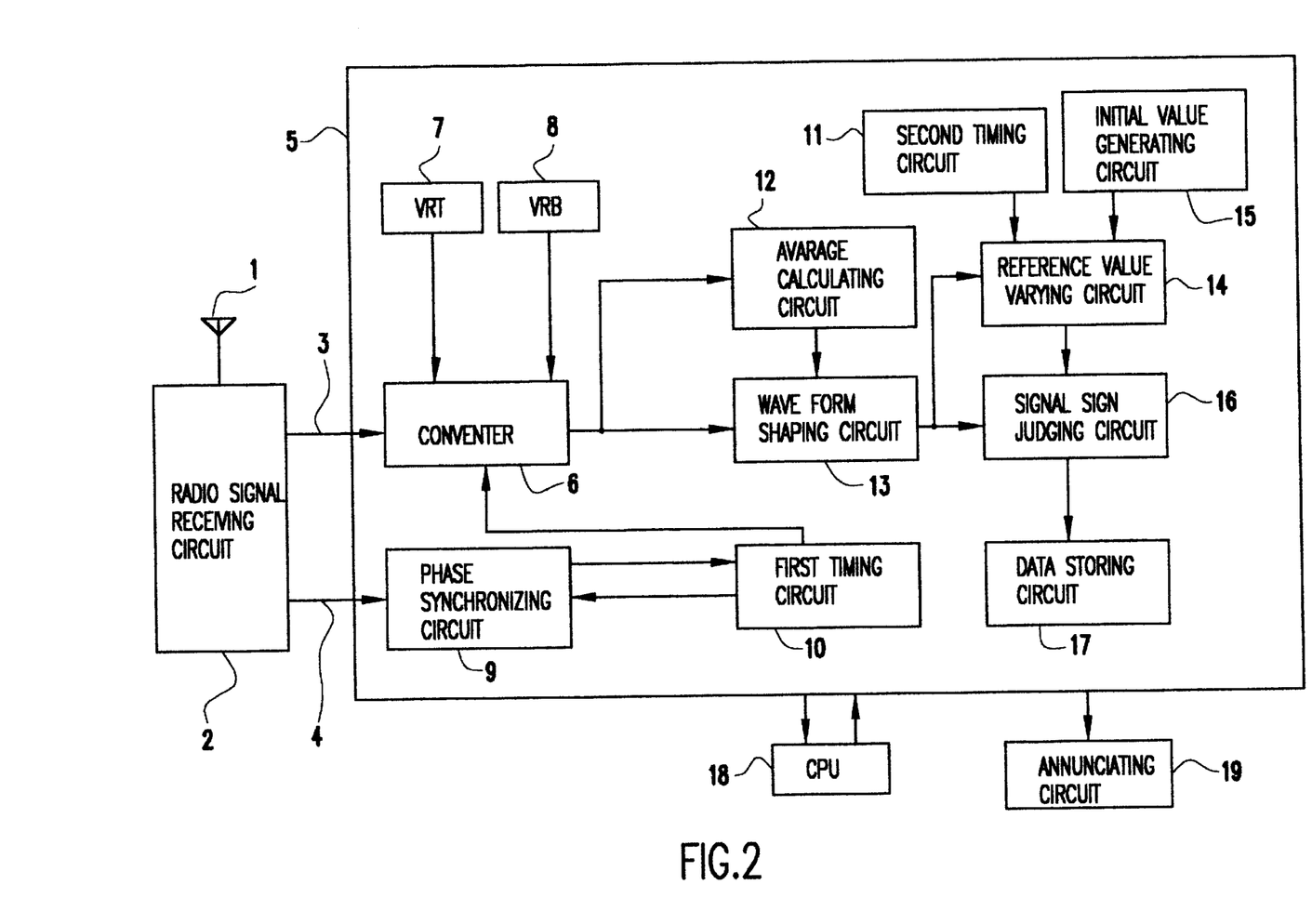
FIG. 2 is a block diagram of a quaternary FSK receiver in accordance with the first embodiment of the present invention.

FIG. 2 is a block diagram illustrating a structure of the quaternary FSK receiver in accordance with the first embodiment. In the first embodiment, a quaternary FSK receiver in accordance with the present invention is applied to a radio signal selective calling receiver.

As illustrated in FIG. 2, a quaternary FSK receiver in accordance with the first embodiment is comprised of an antenna 1, a radio signal receiving circuit 2 electrically connected to the antenna 1, a decoder 5 electrically connected to the radio signal receiving circuit 2, a central processing unit (CPU) 18 electrically connected to the decoder 5, and an annunciating circuit 19 electrically connected to the decoder 5.

Figure 3:
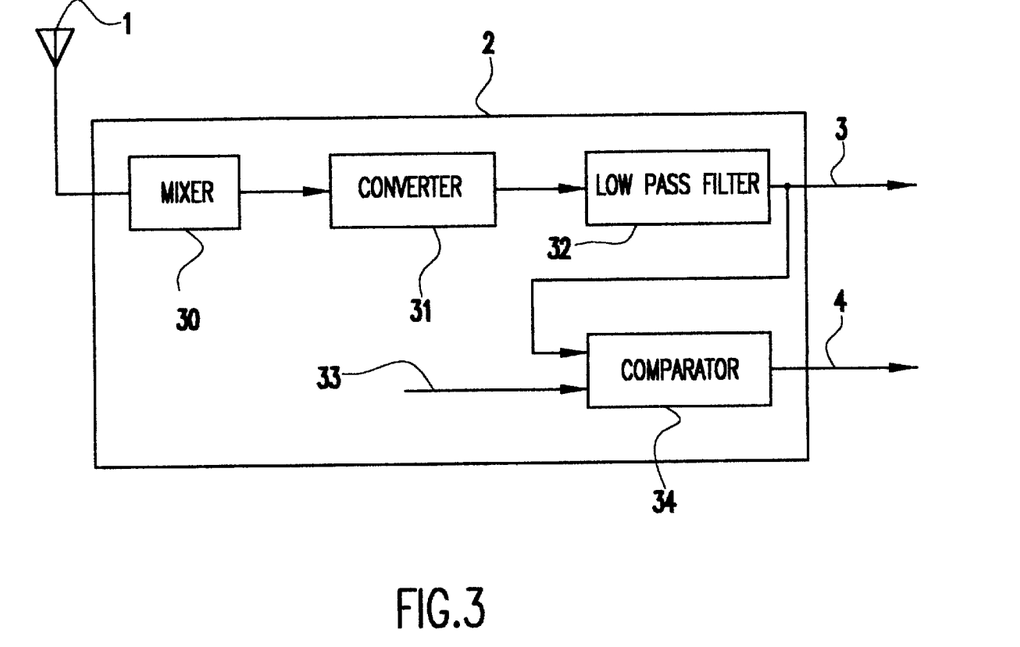
FIG. 3 is a block diagram of the radio signal receiving circuit which is a part of the quaterxiary FSK receiver illustrated in FIG. 2.

FIG. 3 is a block diagram illustrating a structure of the radio signal receiving circuit 2.

As illustrated in FIG. 3, the radio signal receiving circuit 2 is comprised of a mixer 30 electrically connected to the antenna 1, a frequency-voltage (f-V) converter 31 electrically connected to the mixer 30, a low pass filter 32 electrically connected to the f-V converter 31 and transmitting a demodulated signal 3, and a comparator 34 receiving the demodulated signal 3 from the low pass filter 32 and transmitting a comparison signal 4. A reference voltage 33 is applied to the comparator 34.

The mixer 30 converts a frequency of a radio signal having been received through the antenna 1 by multiplying it by a local signal.

The f-V converter 31 converts the signal having been frequency-converted by the mixer 30 into a voltage signal.

The low pass filter 32 remove higher harmonics from the voltage signal transmitted from the f-V converter 31, to thereby output the demodulated signal 3.

The comparator 34 compares the reference voltage 33 which is an intermediate voltage of an amplitude of the demodulated signal 3 to the demodulated signal 3, and outputs comparison result as the comparison signal 4.

Referring back to FIG. 2, the decoder 5 is comprised of an analog-digital (A/D) converter 6 receiving the demodulated signal 3 from the radio signal receiving circuit 2, a voltage reference top (VRT) 7 electrically connected to the A/D converter 6, a voltage reference bottom (VRB) 8 electrically connected to the A/D converter 6, a phase synchronizing circuit 9 receiving the comparison signal 4 from the radio signal receiving circuit 2, a first timing circuit 10 electrically connected to the A/D converter 6 and the phase synchronizing circuit 9, a second timing circuit 11, an average calculating circuit 12, a waveform shaping circuit 13 electrically connected to the A/D converter 6 and the average calculating circuit 12, a reference value varying circuit 14, an initial value generating circuit 15 electrically connected to the reference value varying circuit 14, a sign judging circuit 16, and a data storing circuit 17.

The voltage reference top (VRT) 7 determines an upper limit in analog-digital conversion to be carried out by the A/D converter 6. The voltage reference bottom (VRB) 8 determines a lower limit in analog-digital conversion to be carried out by the A/D converter 6.

The A/D converter 6 converts the demodulated signal 3 into a digital signal at an accuracy obtained when a range of a voltage defined by VRT 7 and VRB 8 is divided with 8-bit resolution or divided by 256.

Since a range of a voltage of the demodulated signal 3 transmitted from the radio signal receiving circuit 2 is already known, a range of a voltage defined by VRT 7 and VRB 8 can be set as a fixed voltage which can entirely cover a range of a voltage of the demodulated signal 3.

Hereinbelow is explained a relation between the demodulated signal 3 and a reference value which relation is established when the demodulated signal 3 is analog-digital converted by means of the 8-bit A/D converter 6, with reference to FIG. 4.

Figure 4:
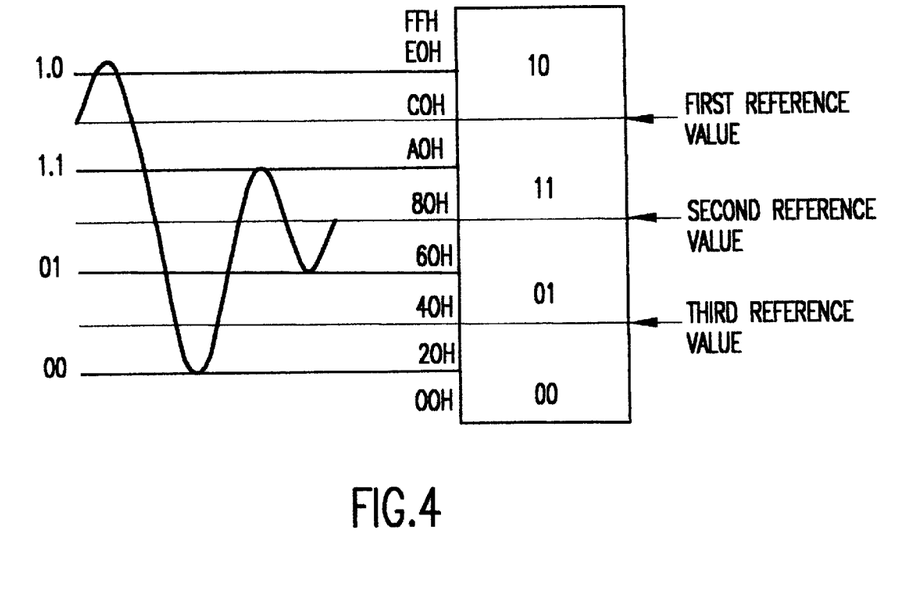
FIG. 4 is a graph showing a relation between a demodulated signal and a reference values.

Since the demodulated signal 3 passes through the low pass filter 32 in a signal modulation step, the demodulated signal 3 depicts a sine curve, as illustrated in FIG. 4. Thus, there exist four waveform peaks in a quaternary FSK signal, and those four peaks correspond to quaternary gray signs "10", "11", "01" and "00". When the demodulated signal 3 is A/D converted by means of the 8-bit A/D converter 6, the demodulated signal 3 is converted digital signs "00H", "20H", "40H", "60H", "80H", "A0H", "C0H", "E0H", and "FFH". Herein, "H" means hexadecimal number system. In FIG. 4, "00", "01", "11" and "10" correspond to "20H", "60H", "A0H " and "E0H", respectively.

If a radio signal is received without being influenced by noises and so on, there has to theoretically exist the above-mentioned four levels. However, radio signal receiving levels have variance caused by noises and reduction in an electric field level, and hence, it would be necessary to establish a reference value for distinguishing signs from one another. It is optimal that reference values associated with respective signs are set intermediate between adjacent signs. Hence, a reference value intermediate between quaternary signs "10" and "11" is set as "C0H" corresponding to a first reference value, a reference value intermediate between quaternary signs "11" and "01" is set as "80H" corresponding to a second reference value, and a reference value intermediate between quaternary signs "01" and "00" is set as "40H" corresponding to a third reference value.

The first timing circuit 10 controls a timing at which the A/D converter 6 receives data for A/D conversion. The phase synchronizing circuit 9 detects a difference in phase between the comparison signal 4 and the first timing circuit 10, and controls the first timing circuit 10 for phase-synchronization. As a result, the first timing circuit 10 can start A/D conversion at a timing at which an eye pattern of the demodulated signal 3 is open to the greatest degree.

The average calculating circuit 12 calculates an average of digital signals having been converted by means of the A/D converter 6. The waveform shaping circuit 13 entirely increases or decreases values of the digital signals transmitted from the A/D converter 6 in such a manner that an average calculated by the average calculating circuit 12 becomes equal to the second reference, that is, "80H " in FIG. 4.

The initial value generating circuit 15 generates the first to third reference values to be used for judging a sign of a signal, and also generates first to fourth ideal values each associated with each of quaternary signs, if the demodulated signal 3 had an ideal amplitude.

The second timing circuit 11 disallows the reference value varying circuit 14 to vary a reference value while a synchronization signal is being received, and allows the reference value varying circuit 14 to vary a reference value after a synchronization signal has been detected.

The reference value varying circuit 14 gradually varies the first reference value by a predetermined value at a timing indicated by the second timing circuit 11, in accordance with the sign "10" which is the greatest level among the digital signals having been waveform-shaped by the waveform shaping circuit 13. In addition, the reference value varying circuit 14 gradually varies the third reference value by a predetermined value at a timing indicated by the second timing circuit 11, in accordance with the sign "00" which is the smallest level among the digital signals having been waveform-shaped by the waveform shaping circuit 13.

The first and third reference values are gradually varied by a predetermined value by means of the reference value varying circuit 14, as mentioned above. In the instant embodiment, since the first and third reference values are constituted of digital signals, a minimum value in the above-mentioned predetermined value is equal to one (1).

Figure 5:
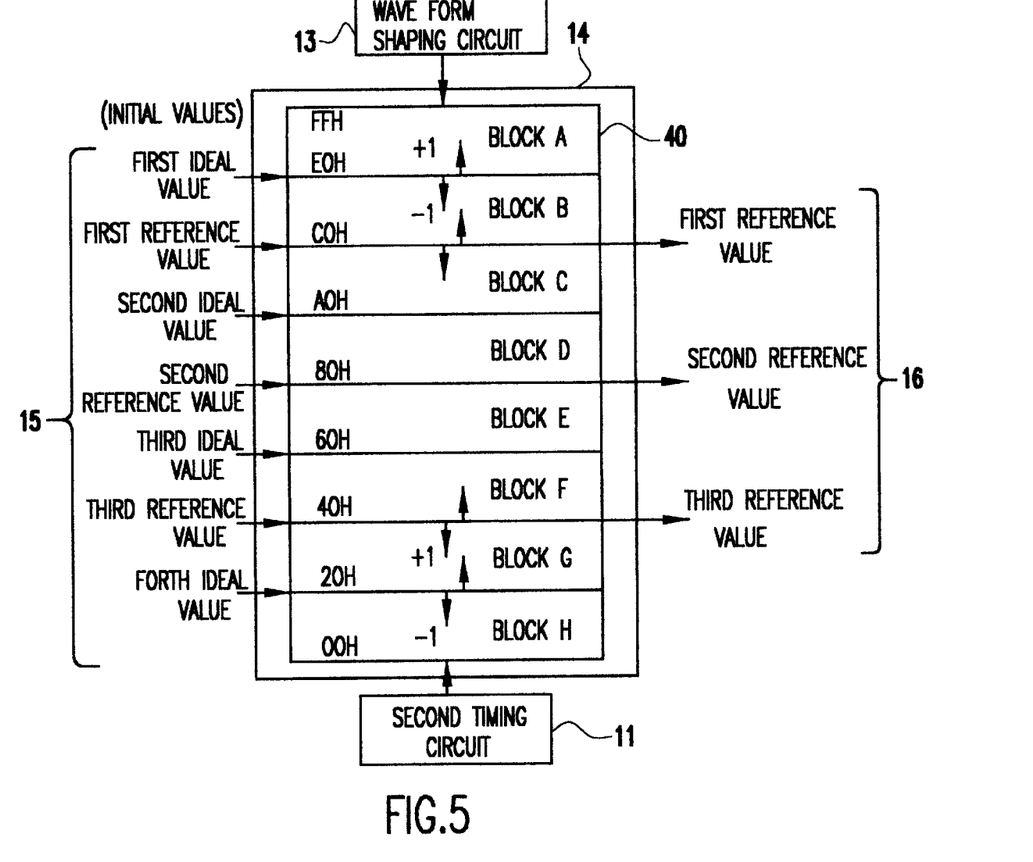
FIG. 5 is a block diagram of the reference value establishing circuit which is a part of the quaternary FSK receiver illustrated in FIG. 2.

FIG. 5 is a block diagram of the reference value varying circuit 14. With reference to FIG. 5, the reference value varying circuit 14 is comprised of a comparator 40.

The comparator 40 is divided into eight blocks A to H, and assigned initial values E0H, C0H, A0H, 80H, 60H, 40H and 20H as initial values at boundaries between the eight blocks. Among those initial values, "C0H", "80H" and "40H" are assigned as the first, second and third reference values, respectively.

Some of the boundaries of the comparator 40 are designed to be variable. The reference value varying circuit 14 carries out a control as follows.

If a digital signal having been transmitted from the waveform shaping circuit 13 had a level existing in the block A, one (1) is added to both the first ideal value (E0H) and the first reference value (C0H).

If a digital signal having been transmitted from the waveform shaping circuit 13 had a level existing in the block B, one (1) is subtracted from both the first ideal value (E0H) and the first reference value (C0H).

If a digital signal having been transmitted from the waveform shaping circuit 13 had a level existing in the block G, one (1) is added to both the third reference value (40H) and the fourth ideal value (20H).

If a digital signal having been transmitted from the waveform shaping circuit 13 had a level existing in the block H, one (1) is subtracted from both the third reference value (40H) and the fourth ideal value (20H).

Allowance or disallowance for varying the reference values and the ideal values by the reference value varying circuit 14 is controlled by the second timing circuit 11. Specifically, the reference and ideal values are not varied while a synchronization signal is being received.

The sign judging circuit 16 converts a digital signal having been waveform-shaped, into a quaternary digital sign in accordance with a reference value determined by the reference value varying circuit 14.

The data storing circuit 17 stores therein signs having been judged by the sign judging circuit 16.

The central processing unit (CPU) 18 annunciates the annunciating circuit 19 that there has been a call, if a predetermined calling message is stored in the data storing circuit 17.

Hereinbelow is explained an operation of the quaternary FSK receiver in accordance with the first embodiment.

A radio signal having been received through the antenna 1 I converted into an electric signal in the radio signal receiving circuit 2, and then, further converted into the demodulated signal 3, or further into the comparison signal 4.

The demodulated signal 3 is converted from an analog signal into a digital signal by means of the A/D converter 6 in a range of a voltage defined by VRT 7 and VRB 8.

The average calculating circuit 12 calculates an average of the digital signals transmitted from the A/D converter 6. The waveform shaping circuit 13 detects a gap between the average having been calculated by the average calculating circuit 12 and the second reference value, and makes such gradual control that a center of a level of a digital signal becomes equal to the second reference, ensuring reduction influence exerted by fluctuation in a central value of the demodulated signal 3 which fluctuation is caused by variation in characteristic of the f-V converter 31 and so on.

The initial value generating circuit 15 generates the first, second and third reference values, and transmits the thus generated first to third reference values to the reference value varying circuit 14. The reference value varying circuit gradually varies the first reference value by a predetermined value at a timing indicated by the second timing circuit, in accordance with the level "10", and gradually varies the third reference value by a predetermined value at a timing indicated by the second timing circuit, in accordance with the level "00".

The signal sign judging circuit 16 judges a sign of the signals having been waveform-shaped by the waveform shaping circuit 13, based on a reference value established by the reference value varying circuit 14, and stores the thus judged signals in the data storing circuit 17.

The central processing unit (CPU) 18 annunciates the annunciating circuit 19 that there has been a call, if a calling message which is stored in advance in CPU 18 is stored in the data storing circuit 17.

In the quaternary FSK receiver in accordance with the first embodiment, even if a central level in the demodulated signal 3 becomes different from an ideal one due to variation in characteristic of the radio signal receiving circuit 2, a sign of a signal is judged through the use of an average of received data as a reference value. Hence, it is possible to receive signals without deterioration in an accuracy with which a sign of a signal is to be judged.

Even if the demodulated signal 3 had an amplitude which is different from an ideal one due to variance in characteristic of the f-V converter 31 constituting the radio signal receiving circuit 2, the first and third reference values are gradually varied by the reference value varying circuit 14, which ensures no error in judging a sign in the signal sign judging circuit 16.

Figure 6:
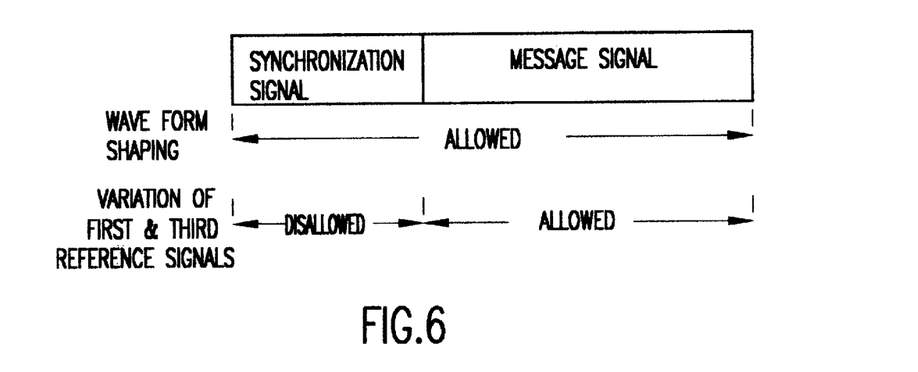
FIG. 6 illustrates a timing at which a signal is allowed or disallowed to be waveform-shaped and a reference value is allowed or disallowed to vary.

FIG. 6 shows a timing at which a signal is allowed or disallowed to be waveform-shaped and a reference value is allowed or disallowed to vary.

In general, a radio signal selective calling receiver first receives a synchronization signal, and then, a message signal. As illustrated in FIG. 6, while a synchronization signal and a message signal are being received, waveform shaping is always allowed to be carried out. That is, there is always carried out such waveform shaping that an average of received data becomes equal to the second reference value.

Variation in the first and third reference signals is controlled by the second timing circuit 11. Specifically, the first and third reference values are not allowed to vary while a synchronization signal is being received. The reason is as follows. Since waveform shaping is gradually carried out in accordance with variation in a central level of the demodulated signal 3, waveform shaping may not be completed while a synchronization signal is being received. If a reference value is caused to vary before waveform shaping is completed, a reference value may be caused to vary in an opposite direction. For this reason, the first and third reference values are disallowed to vary before a synchronization signal is completed.

After a synchronization signal has been detected, the first and third reference values are allowed to vary. That is, the first and third reference values are gradually varied in accordance with a level of the demodulated signal 3.

In the quaternary FSK receiver in accordance with the first embodiment, even if a central level and an amplitude of the demodulated signal 3 are varied, a digital signal is waveform-shaped such that a central level thereof becomes equal to the second reference, and the first and third reference values are gradually increased or decreased. As a result, the quaternary FSK receiver accurately follows variation in the demodulated signal which variation is caused while a radio signal is being received, ensuring enhancement in sensitivity of the quaternary FSK receiver.

Figure 7:
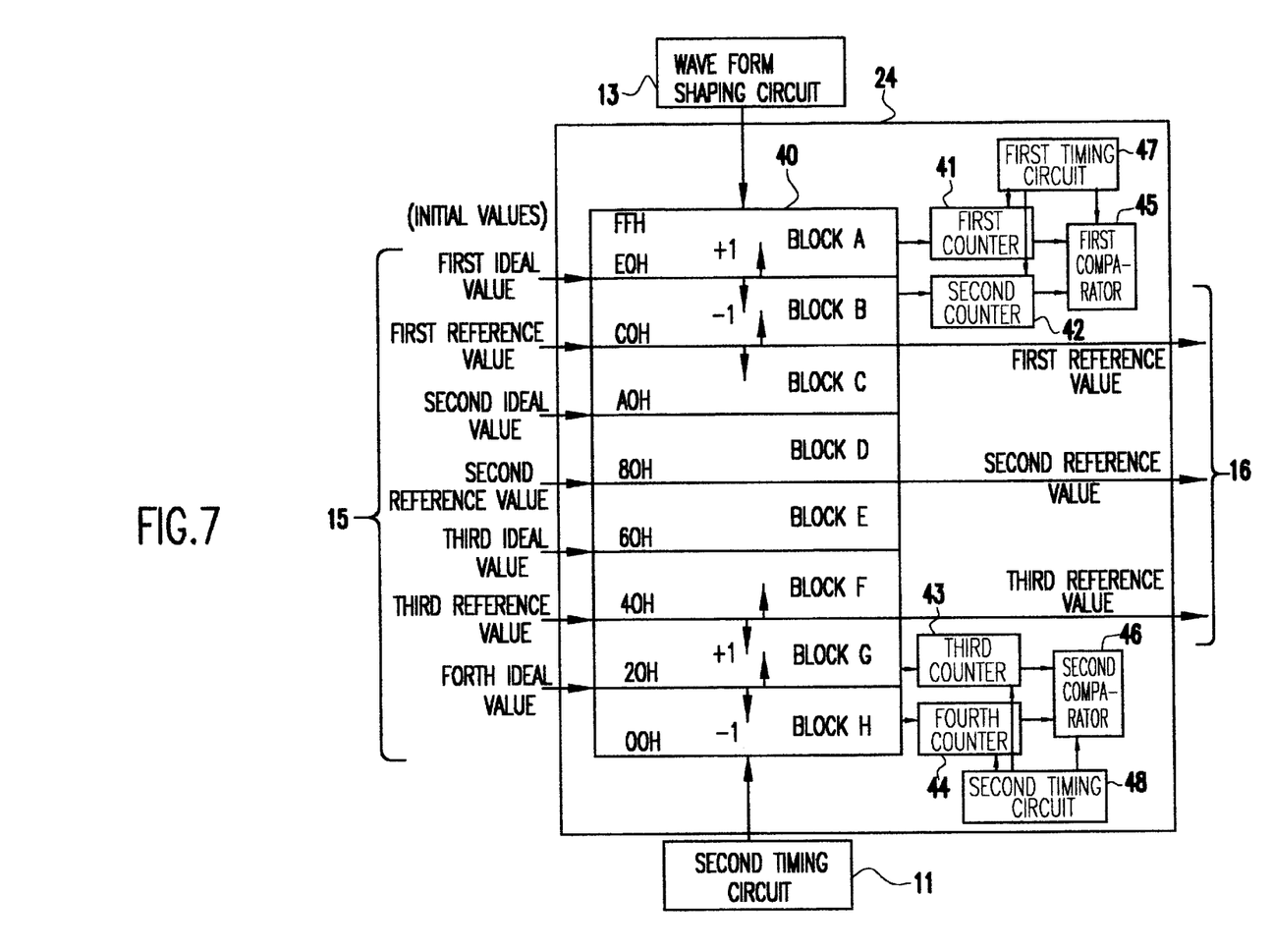
FIG. 7 is a block diagram of the reference value establishing circuit which is a part of the quaternary FSK receiver in accordance with the second embodiment of the present invention.

FIG. 7 is a block diagram of a reference value varying circuit 24 which is a part of the quaternary FSK receiver in accordance with the second embodiment. The quaternary FSK receiver in accordance with the second embodiment is structurally different from the quaternary FSK receiver in accordance with the first embodiment only in that the reference value varying circuit 14 is replaced with the reference value varying circuit 24 illustrated in FIG. 7.

With reference to FIG. 7, the reference value varying circuit 24 is comprised of the comparator 40 which is the same as the comparator employed in the reference value varying circuit 14, a first counter 41 associated with the block A, a second counter 42 associated with the block B, a third counter 43 associated with the block G, a fourth counter 44 associated with the block H, a first comparator 45 which compares output signals transmitted from the first and second counters 41 and 42 to each other, a second comparator 46 which compares output signals transmitted from the third and fourth counters 43 and 44 to each other, a first timing circuit 47 transmitting first timing signals to the first counter 41, the second counter 42 and the first comparator 45, and a second timing circuit 48 transmitting second timing signals to the third counter 43, the fourth counter 44 and the second comparator 46.

The first counter 41 counts a number by which a level of the demodulated signal 3 exists in the block A. Similarly, the second counter 42 counts a number by which a level of the demodulated signal 3 exists in the block B.

The first comparator 45 compares a count of the first counter 41 to a count of the second counter 42. If a count of the first counter 41 is greater than a count of the second counter 42, one (1) is added to both the first ideal value and the first reference value. On the other hand, if a count of the second counter 42 is greater than a count of the first counter 41, one (1) is subtracted from both the first ideal value and the first reference value. A period of time for sampling data, that is, a timing at which the reference value is caused to vary is controlled by the first timing circuit 47.

The third counter 43 counts a number by which a level of the demodulated signal 3 exists in the block G. Similarly, the fourth counter 44 counts a number by which a level of the demodulated signal 3 exists in the block H.

The second comparator 46 compares a count of the third counter 43 to a count of the fourth counter 44. If a count of the third counter 43 is greater than a count of the fourth counter 44, one (1) is added to both the third reference value and the fourth ideal value. On the other hand, if a count of the fourth counter 44 is greater than a count of the third counter 43, one (1) is subtracted from both the third reference value and the fourth ideal value. A period of time for sampling data, that is, a timing at which the reference value is caused to vary is controlled by the second timing circuit 48.

In accordance with the second embodiment, even if levels of the demodulated signals 3 are temporarily disturbed due to noises and so on, since the first and third reference values are caused to vary under majority rule of a plurality of data, it would be possible to prevent the first and third reference values from being wrongly varied.

In the above-mentioned first and second embodiments, the present invention is applied to a radio signal selective calling receiver. However, it should be noted that the present invention may be applied to any radio signal communication device other than a radio signal selective calling receiver.

In the above-mentioned first and second embodiments, the demodulated signal 3 is converted from an analog signal to a digital signal by virtue of 8-bit resolution. However, it should be noted that the demodulated signal 3 may be converted from an analog signal to a digital signal by virtue of N-bit resolution wherein N is an integer other than 8.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-247425 filed on Sep. 1, 1998 including specification, claims, drawings and summary is incorporated herein by reference in its entirety.

What is claimed is:

1. A quaternary FSK receiver comprising:
   (a) a receiver which receives quaternary FSK applied signals and converts the thus received quaternary FSK applied signals into demodulated signals;
   (b) an initial value generator which, when said demodulated signals have ideal amplitudes, generates first, second, third and fourth ideal values each corresponding to each of signs of a quaternary, and also generates a first reference value intermediate between said first ideal value and said second ideal value, a second reference value intermediate between said second ideal value and said third ideal value, and a third reference value intermediate between said third ideal value and said fourth ideal value;
   (c) an analog-digital converter which converts said demodulated signals into digital signals;
   (d) a sign judge which compares said digital signals to said first to third reference values to thereby judge which sign a received signal has among signs of a quaternary;
   (e) an average calculator which calculates an average of said digital signals;
   (f) a waveform shaper which always gradually entirely increases or decreases said digital signals by a predetermined value so that said average is equal to said second reference value; and
   (g) a reference value generator which varies said first reference value in accordance with a digital signal having a value equal to or greater than said first reference value, among said digital signals having been waveform-shaped by said waveform shaper, and also varies said third reference value in accordance with a digital signal having a level equal to or smaller than said third reference value, among said digital signals having been waveform-shaped by said waveform shaper.

2. The quaternary FSK receiver as set forth in claim 1, further comprising a timing controller which disallows said reference value generator to vary a reference value while a synchronization signal is being received, and allows said reference value generator to vary a reference value after said synchronization signal has been received.

3. The quaternary FSK receiver as set forth in claim 1, wherein said reference value generator
   increases said first ideal value and said first reference value by a predetermined value when a digital signal having been waveform-shaped by said waveform shaper has a level equal to or greater than said first ideal value,
   decreases said first ideal value and said first reference value by a predetermined value when a digital signal having been waveform-shaped by said waveform shaper has a level smaller than said first ideal value and equal to or greater than said first reference value,
   increases said third reference value and said fourth ideal value by a predetermined value when a digital signal having been waveform-shaped by said waveform shaper has a level smaller than said third reference value and equal to or greater than said fourth ideal value, and decreases said third reference value and said fourth ideal value by a predetermined value when a digital signal having been waveform-shaped by said waveform shaper has a level smaller than said fourth ideal value.

4. The quaternary FSK receiver as set forth in claim 1, wherein said reference value generator is comprised of:
   (a) a first counter which counts how many times a digital signal having been waveform-shaped by said waveform shaper has a level equal to or greater than said first ideal value;
   (b) a second counter which counts how many times a digital signal having been waveform-shaped by said waveform shaper has a level smaller than said first ideal value and equal to or greater than said first reference value;
   (c) a first comparator which compares counts of said first and second counters to each other, and increases said first ideal value and said first reference value by a predetermined value when a count of said first counter is greater than a count of said second counter, and decreases said first ideal value and said first reference value by a predetermined value when a count of said second counter is greater than a count of said first counter;
   (d) a third counter which counts how many times a digital signal having been waveform-shaped by said waveform shaper has a level equal to or greater than said fourth ideal value and smaller than said third ideal value;
   (e) a fourth counter which counts how many times a digital signal having been waveform-shaped by said waveform shaper has a level smaller than said fourth ideal value; and
   (f) a second comparator which compares counts of said third and fourth counters to each other, and increases said third reference value and said fourth ideal value by a predetermined value when a count of said third counter is greater than a count of said fourth counter, and decreases said third reference value and said fourth ideal value by a predetermined value when a count of said fourth counter is greater than a count of said third counter.

5. A method of judging signals in a quaternary FSK receiver, comprising the steps of:
   (a) converting quaternary FSK applied signals having been received, into demodulated signals;
   (b) generating first, second, third and fourth ideal values each corresponding to each of signs of a quaternary, and also generating a first reference value intermediate between said first ideal value and said second ideal value, a second reference value intermediate between said second ideal value and said third ideal value, and a third reference value intermediate between said third ideal value and said fourth ideal value, when said demodulated signals have ideal amplitudes;
   (c) converting said demodulated signals into digital signals;
   (d) comparing said digital signals to said first to third reference values to thereby judge which sign a received signal has among signs of a quaternary;
   (e) calculating an average of said digital signals;
   (f) gradually entirely increasing or decreasing said digital signals all the time by a predetermined value so that said average is equal to said second reference value; and
   (g) varying said first reference value in accordance with a digital signal having a value equal to or greater than said first reference value, among said digital signals having been waveform-shaped by said waveform shaper, and also varying said third reference value in accordance with a digital signal having a level equal to or smaller than said third reference value, among said digital signals having been waveform-shaped by said waveform shaper.

6. The method as set forth in claim 5, further comprising the step of disallowing a reference value to be varied while a synchronization signal is being received, and allowing a reference value to be varied after said synchronization signal has been received.

7. The method as set forth in claim 5, wherein in said step (g),
   said first ideal value and said first reference value are increased by a predetermined value when a digital signal having been waveform-shaped has a level equal to or greater than said first ideal value,
   said first ideal value and said first reference value are decreased by a predetermined value when a digital signal having been waveform-shaped has a level smaller than said first ideal value and equal to or greater than said first reference value,
   said third reference value and said fourth ideal value are increased by a predetermined value when a digital signal having been waveform-shaped has a level smaller than said third reference value and equal to or greater than said fourth ideal value, and
   said third reference value and said fourth ideal value are decreased by a predetermined value when a digital signal having been waveform-shaped has a level smaller than said fourth ideal value.

8. The method as set forth in claim 5, wherein said step (g) includes the steps of:
   (g1) counting how many times a digital signal having been waveform-shaped has a level equal to or greater than said first ideal value, to thereby have a first count;
   (g2) counting how many times a digital signal having been waveform-shaped has a level smaller than said first ideal value and equal to or greater than said first reference value, to thereby have a second count;
   (g3) comparing said first and second counts to each other;
   (g4) increasing said first ideal value and said first reference value by a predetermined value when said first count is greater than said second count, or decreasing said first ideal value and said first reference value by a predetermined value when said second count is greater than said first count;
   (g5) counting how many times a digital signal having been waveform-shaped has a level equal to or greater than said fourth ideal value and smaller than said third ideal value, to thereby have a third count;
   (g6) counting how many times a digital signal having been waveform-shaped as a level smaller than said fourth ideal value, to thereby have a fourth count;
   (g7) comparing said third and fourth counts to each other; and
   (g8) increasing said third reference value and said fourth ideal value by a predetermined value when said third count is greater than said fourth count, or decreasing said third reference value and said fourth ideal value by a predetermined value when said fourth count is greater than said third count.

* * * * *